July 25, 1961 W. A. PENNINGTON 2,993,219
ADJUSTABLE LOADING RAMP

Filed April 10, 1958 3 Sheets-Sheet 1

INVENTOR.
WILLIAM A. PENNINGTON
BY *Kenneth E. Shaweker*
ATTORNEY

INVENTOR.
WILLIAM A. PENNINGTON
BY Kenneth E. Shaweker
ATTORNEY

INVENTOR.
WILLIAM A. PENNINGTON
BY Kenneth E. Shaweker
ATTORNEY

United States Patent Office 2,993,219
Patented July 25, 1961

2,993,219
ADJUSTABLE LOADING RAMP
William A. Pennington, Pittsburgh, Pa., assignor to Superior Railway Products Corporation, Pittsburgh, Pa., a corporation of Pennsylvania
Filed Apr. 10, 1958, Ser. No. 727,624
4 Claims. (Cl. 14—71)

This invention relates to an extensible and retractable loading apron for a loading ramp.

In the handling of materials in present day commerce, it is common practice to employ loading ramps at docks or doorways where trucks and/or railway cars are loaded or unloaded. These ramps compensate for the variation in heights between the dock level and the truck or car floor level. The position of the vehicle bed in respect to the loading dock is dependent on the skill of the driver, the size of the vehicle and the relative height of the vehicle in respect to the dock.

Conventional mechanically or hydraulically operated loading ramps consist of rectangular shaped platforms that are hinged along one edge to stationary platforms. The free edge of these platforms may be elevated or lowered to compensate for truck floor of varying elevation. These ramps are generally provided with an apron or tongue which extends beyond the free edge of the ramp and which is positioned to rest on the floor of the truck. Neither the free edge of the ramp nor the extending apron of the conventional ramp can be positioned horizontally. A loading ramp of practical construction which is capable of horizontal adjustment of the free edge of the ramp or of the apron has long been desired.

Ramps have been devised that may be extended or retracted horizontally as well as raised and lowered; however, these devices are complex in structure, expensive to build and require considerable maintenance. Such devices are described in United States Patents No. 2,639,450 to Ramer and No. 2,689,965 to Fenton.

It has now been found that by the device of the present invention an extensible and retractable apron may be provided to a loading ramp that is simple in construction, economical to build and requires little maintenance. The device of the present invention comprises an apron assembly in combination with a loading ramp that may be mechanically or hydraulically extended or retracted to facilitate the engagement of truck or railway car floors.

It is therefore the object of the present invention to provide a loading ramp with a mechanically or hydraulically operated apron that may be extended or retracted.

It is an additional object of the present invention to provide a loading ramp with an apron that may be extended beyond the end of the ramp or that may be retracted.

A still further object of the present invention is to provide a loading ramp wherein the apron may be traveled along slide arms so as to be propelled beyond the free loading edge of the ramp.

Other objects and advantageous features may be best described by the following specifications and drawings wherein.

Figure 1:
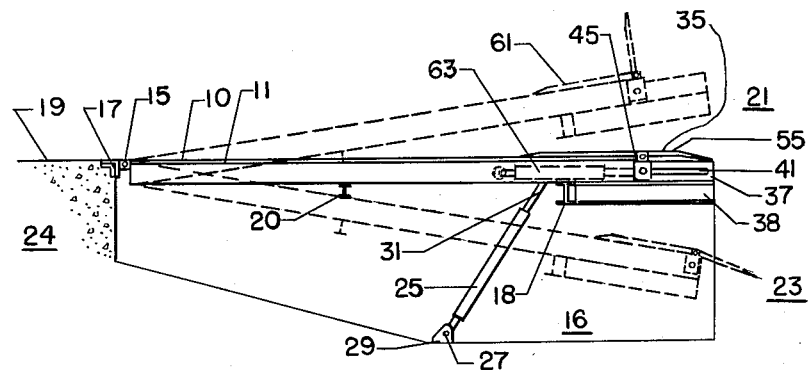
FIGURE 1 is a side elevation view of a ramp constructed in accordance with the present invention, the ramp being shown in its horizontal and also diagrammatically in an upward and in a downward inclined position.

In the drawings there is shown a loading ramp 10 comprising a platform 11 which is supported by frame members 13. Frame members 13 terminate at the free end of the ramp at end plate 14 and at the hinged edge at end plate 16. The platform 11 of ramp 10 and frame members 13 are reinforced with cross beams 18 and 20 that are attached as by welding, etc., to the bottom of frame members 13. In the present embodiment cross beams 18 and 20 are formed of "I" shaped beams; however, beams of any configuration and adequate strength may be employed.

Figure 4:
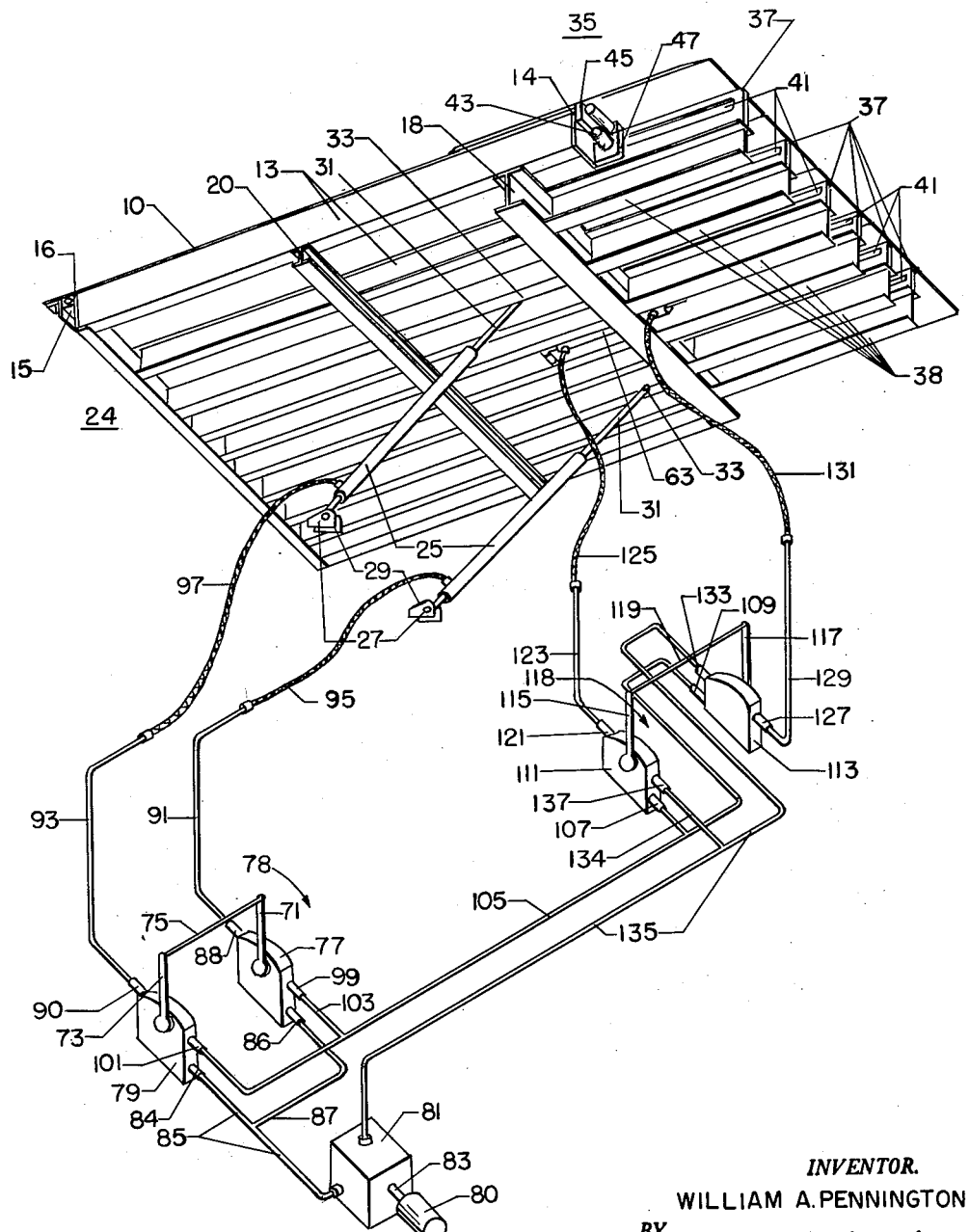
FIG. 4 is a perspective view of the ramp to FIG. 1 showing the underneath portion of the ramp and its hydraulic system.

In the present embodiment the ramp is positioned within a concrete dock structure shown generally in FIG. 1 as 24. The ramp is hinged as shown at 15 (FIGS. 1 and 4) to an angle frame 17, appropriately imbedded in the concrete dock 24 to permit pivoting of the ramp and allowing positioning of the free end of the ramp. Fig. 1 shows the ramp in a horizontal position in respect to the loading surface 19 of dock 24 and also depicts the ramp diagrammatically as in a raised position shown generally at 21, as to contact a vehicle bed of greater height than dock surface 19, and in a lowered position 23, as to contact a vehicle bed lower than dock surface 19. The mechanical motivating force employed in the illustrated embodiment is shown to be hydraulic cylinders 25 pivotally connected, as shown at 27, to bracket plates 29, which are in turn mounted on a sling member (not shown) that is attached to the bottom of dock pit 16. Plungers 31 of hydraulic cylinders 25 are pivotally connected to two of the frame members of the ramp 10 as shown at 33 (FIG. 4).

It is obvious that the ramp may be raised or lowered to positions such as are illustrated by diagrammatic views 21 and 23 in FIG. 1 by actuation of hydraulic cylinders 25.

In the present embodiment the extensible and retractable apron assembly is shown generally at 35. This assembly consists of numerous slide arms 37 that are shown to be rigidly attached as by welding, etc., to end plate 14. Arms 37 are given additional support by reinforcing members 38, one of which is located under each arm and is attached as by welding, etc., to cross plate 18. Although the reinforcing members in the present embodiment are not centered on frame members 13 in that there happens to be more frame members 13 than reinforcing members 38, reinforcing members 38 are adjacent to one or more of the frame members 13 and are attached thereto as by welding, etc., to effect greater reinforcing strength to reinforcing members 38. Each arm is shown to possess an elongated slot 41. All of the slots (see in particular FIG. 4) are shown to be in substantial alignment with one another. An elongated pin 43 is shown as projecting through all of the slots 41; pin 43 is of such a diameter as to permit it to slide in the slots 41.

Figure 2:
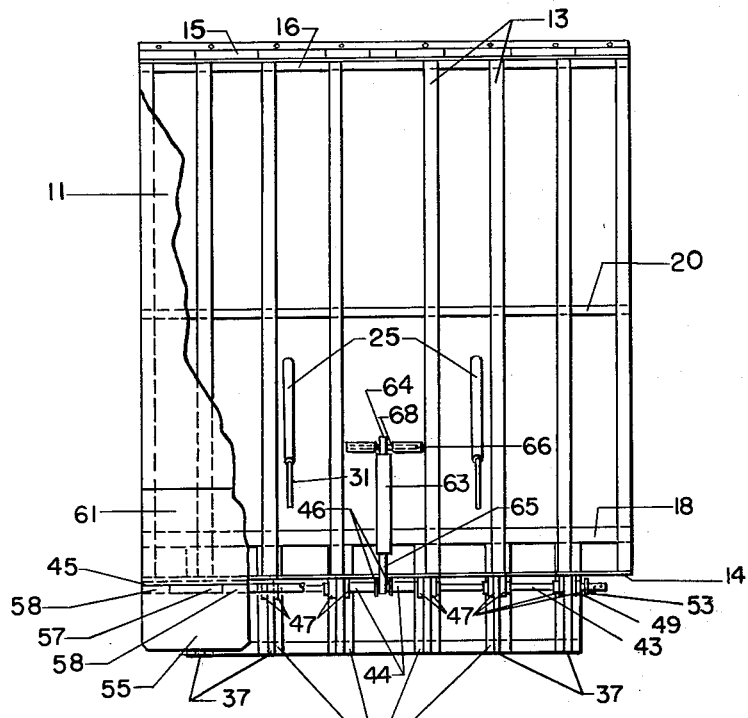
FIG. 2 is a top plan view of the loading ramp of FIG. 1, being broken away to more clearly show the supporting members.
Figure 3:
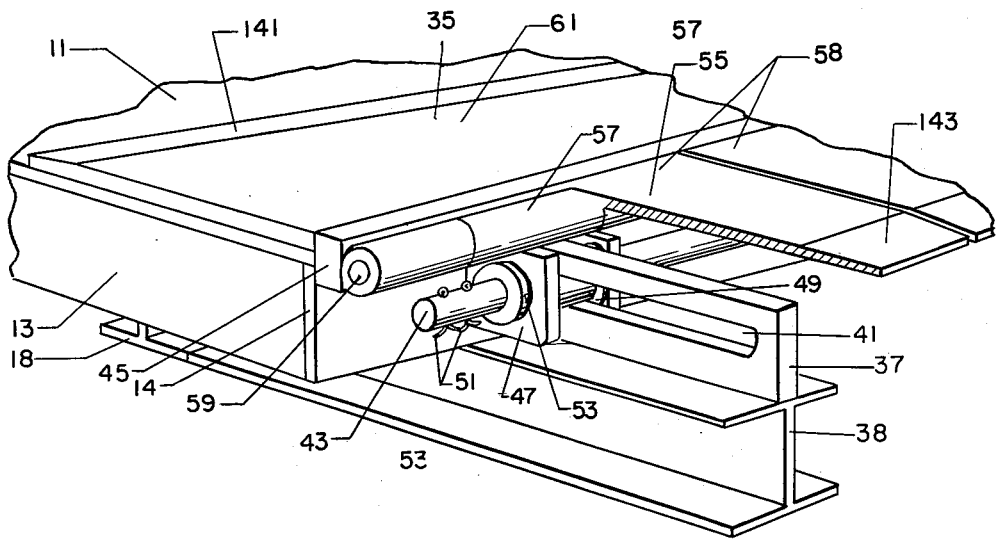
FIG. 3 is an enlarged perspective view in elevation of a cut away portion of the slide structure of the ramp apron of FIG. 1.
Figure 5:
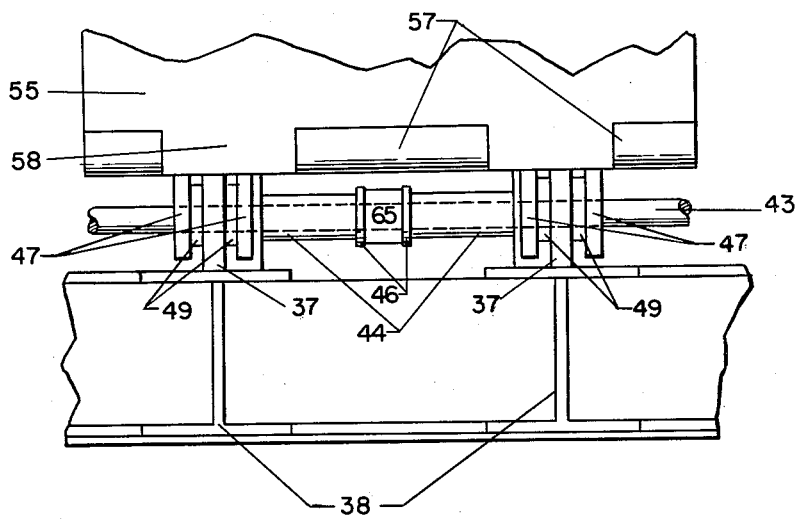
FIG. 5 is an enlarged front elevation view of a broken away portion of the ramp of FIG. 1 showing the center leaf and adjacent structure.

Positioned above arms 37 is a hinge assembly 45 that is connected to pin 43 through moving lugs 47 (FIG. 3). Moving lugs 47 in the present embodiment are rectangular shaped members, each containing a perforation through which pin 43 is projected. One moving lug 47 is positioned on either side of each slide arm 37 (FIG. 2). The moving lugs 47 are rigidly attached, as by welding, etc., to hinge assembly 45. Between each moving lug 47 and slide arm 37 there is located a washer 49 (FIG. 5) which serves to maintain a spaced relationship between moving lugs 47 and slide arms 37. Pin 43 is maintained in its position as projected through slots 41 by means of cotter pins 51 projecting through perforations in the ends of pin 43 and appropriate retaining washers 53.

Hinge assembly 45 is hinged to a number of apron leaves 55 (in the present embodiment five) by means of alternate hinge loops 57 and 58 (FIG. 3) that are alternatively attached to the apron leaves 55 (loops 58) and the hinge assembly 45 (loops 57), respectively. A hinge pin 59 projects through all loops so that leaves 55 may be pivotally motivated upwardly, as shown in the illustrative diagrammatic view 21 of FIG. 1 or downwardly as shown in view 23 of FIG. 1. Hinge assembly 45 is also attached to an approach apron or slide plate 61 which extends rearwardly and either covers the area exposed between the hinge assembly 45 and the ramp when the hinge assembly 45 is in a forward position as shown in view 23 of FIG. 1 or rests on the ramp deck 11 when hinge assembly is in a retracted position as shown in view 21 of FIG. 1.

In operation the pin 43 is caused to slide forwardly or rearwardly in slots 41 of slide arms 37 by the motivating force applied through a hydraulic ram 63 (FIG. 2) that is connected to pin 43 through plunger 65.

Hydraulic ram 63 is mounted between, and is parallel with, two of the centrally located frame members 13. In the present embodiment the ram 63 is held in position by a pin 68 that is attached to and spans the gap between the two frame members 13 and which projects through an eye member 64 that is rigidly attached to the rear portion of ram 63. The pin 68 also projects through two sleeve members 66 located on either side of eye member 64 that serve to maintain the ram 63 in a centralized position between frame members 13. Plunger 65 contains a circular perforation in its forward end through which the pin 43 projects; thus pin 43 is forced to slide along slots 41 of arms 37 when plunger 65 is extended or retracted. Sleeve members 44 and washers 46 are located on either side of plunger 65 to maintain plunger 65 in a centralized position between the adjoining arms 37, washers 49 and moving lugs 47.

The overall hydraulic motivating system of the present embodiment is shown in FIG. 4. In this figure the ramp is shown as looking from underneath to more clearly illustrate the functioning of the dock 24 which normally extend out on either side of the ramp are not shown. In FIG. 4 hydraulic lift levers 71 and 73 are joined by a connecting rod 75 so that valves 77 and 79 are actuated simultaneously. Thus by throwing levers 71 and 73 in a forward direction (arrow 78) hydraulic pressure supplied by pressure reservoir 81 and pump 83, which is actuated by electric motor 80, flows through lines 85 and 87 through valve openings 84 and 86, through the valves 77 and 79, through valve openings 88 and 90, lines 91 and 93 and flexible hoses 95 and 97 to hydraulic rams 25 where the fluid pressure causes plungers 31 to extend and elevate the ramp. The position of the ramp is stabilized by returning levers 71 and 73 to a straight up and down position (as shown) in that valves 77 and 79 are shut off insofar as openings 90 and 88 are concerned so that the ramp remains in whatever position it was in when levers 71 and 73 were returned to the straight up and down position. However, when the levers 71 and 73 are in the straight up and down position, hydraulic fluid pressure is directed from inlets 86 and 84 from reservoir 81 and pump 83 through by-pass openings 99 and 101 through lines 103 and 105 to openings 107 and 109 of valves 111 and 113 that operate ram 63. When valve levers 71 and 73 of valves 77 and 79 are thrown into a rearward position (opposite the direction of arrow 78) hydraulic fluid pressure in lines 91 and 93 (and rams 25) may return through openings 88 and 90 of valves 77 and 79 and pass out of by-pass openings 99 and 101 through lines 103 and 105 and back to pump 83 and reservoir 81 when arms 115 and 117 of valves 111 and 113 are in a straight up and down position as will be more fully explained below. The weight of the ramp will cause plungers 31 to collapse or retract due to loss of fluid pressure in lines 91 and 93 and flexible hoses 95 and 97 and the ramp will lower. It may be desirable to shut off motor 80 and thus pump 83 to lessen hydraulic fluid pressure which also passes from openings 84 and 86 through valves 77 and 79 and out of by-pass openings 99 and 101 when levers 71 and 73 are in a rearward position and thus hasten lowering of the ramp.

Hydraulic ram 63 is operated through levers 115 and 117 which are synchronized in their actions by a connecting rod 119. Valves 111 and 113 are, however, reversed in respect to one another. Hydraulic pressure, as shown above, is supplied from lines 103 and 105 and therefore the present hydraulic system operating apron 35 may operate only when fluid pressure is available through by-pass openings 99 and 101 of valves 77 and 79, as when levers 71 and 73 are in a straight up and down position. When levers 115 and 117 are thrown forward in the direction indicated by the arrow 118, hydraulic fluid pressure (when available) flows through opening 107 of valve 111 out of the opening 121 and through line 123 and flexible hose 125 into the back portion of ram 63. Valve 113 is, however, simultaneously thrown into reverse so that fluid pressure may not flow from opening 109 through opening 127 and line 129 but instead fluid pressure from the forward portion of the ram 63 may flow from these lines (131 and 129) into openings 127 and out by-pass opening 133 to line 135 and back to reservoir 81 and pump 83. Thus, pressure builds up in the rear portion of ram 63 in back of the encased ram piston (not shown) while pressure is relieved from the front portion through hose 131 and line 129 and plunger 65 is projected forward motivating pin 43 in slots 41 and effecting forward movement of the entire apron assembly 35 for the length that pin 43 may travel in slots 41. When levers 115 and 117 are brought into a straight up and down position (as shown) the fluid pressure on ram 63 is stabilized in that openings 121 and 127 leading to the ram 63 are closed and fluid pressure in the ram 63 remains static. When in this position fluid pressure is shunted from inlets 107 and 109 out by-pass openings 133 and 137 through lines 134 and 135 back to reservoir 81 and pump 83. When levers 115 and 117 are thrown into a rearward position (opposite the direction of arrow 118) pressure from line 105 flows through opening 109 of valve 113 out opening 127 and through line 129, flexible hose 131 and into the forward portion of ram 63. Meanwhile pressure in the rear portion of the ram passes through hose 125, line 123, opening 121, valve 111, by-pass opening 137, lines 134 and 135 to reservoir 81 and pump 83. Thus the encased piston (not shown) is forced in a rearward direction, retracting plunger 65, pin 43 and apron assembly 35 in general.

Thus in the present embodiment positioning of the ramp may be effectively controlled by manipulation of levers 71 and 73 and apron 35 may be easily and conveniently extended and retracted by positioning of levers 115 and 117.

It is to be understood, of course, that the exact location and arrangement of hydraulic equipment shown by FIG. 4 is illustrative only; such levers and pumps may be located above the dock 24 and in back of the ramp. Also, it is obvious that other mechanical manipulation means than those shown in the present embodiment may be employed.

In extending apron assembly 35 it is seen that the apron may be extended and employed where desired to alleviate waste of space and to facilitate obtaining a bridging apron. Where the apron is extended it may be seen that apron approach 61 covers up the space previously occupied by the surface of the apron leaves. In the present embodiment a beveled edge 141 (FIG. 3) is provided to facilitate the "wheeling" of objects over the ramp giving a relatively smooth approach. A similar bevel 143 is provided to the leading edges of the apron leaves 55.

The ramps of the present invention may be constructed of any material of suitable strength but will normally be constructed entirely of steel.

Although the above shown figures illustrate a convenient and desirable ramp constructed in accordance with the present invention, many other variations and modifications are obvious that are included within the scope of the present specification. For example, modifications of the present apron may be applied to the ramps mentioned in earlier sections of the present specification. Should the situation arise several individually operated aprons constructed in accordance with the present invention may be incorporated into a single ramp. As is obvious from the description given, a minimum of one extending slide arm is required and any number over one may be used. Also, of course, the apron leaves may be as few as one. The number of hydraulic pistons for the ramp and apron assembly may vary. In addition, other power means than electric hydraulic may be used.

Although the illustrated embodiment shows a concrete dock it is obvious such a dock may be constructed of other materials such as steel or wood and may be movable rather than stationary. Also, although the apron leaves of the present invention are preferably hinged along one edge thereof, it is obvious such leaves may be rigidly attached to hinge assembly 45.

I claim:

1. In a leading ramp wherein a movable platform is hinged along one edge to a stationary platform, the combination comprising, a plurality of spaced parallel slide arms attached to and extending beyond the free edge, opposite the hinged edge of said movable platform, each said arm being formed with a longitudinally positioned slot shaped perforation, said perforations being in substantial alignment with one another, an extensible and retractable apron having an elongated slide member positioned as projected through said perforations and disposed to slide in said slot shaped perforations, a second elongated slide member positioned along the upper surface of said arms connected to said elongated slide member so as to be propelled along the upper surface of said arms by sliding motion of said elongated slide member, a plurality of apron leaves hinged to said second slide member along one edge thereof and a slide plate attached to said second slide member and disposed to cover the upper surface of said slide arms and the area between said slide arms between said free edge of the ramp and said second slide member and power means to slide said elongated slide member in said perforations.

2. In a loading ramp wherein a movable platform is hinged to a stationary platform, the combination comprising a plurality of spaced parallel slide arms attached to and extending beyond the free edge, opposite the hinged edge of said movable platform, each said arm being formed with a longitudinally positioned slot shaped perforation, said perforations being in substantial alignment with one another, an extensible and retractable apron having an elongated slide member positioned as projected through said perforations and disposed to slide in said slot shaped perforations, a second elongated slide member positioned along the upper surface of said arms, connected to said elongated slide member so as to be propelled along the upper surface of said arms by sliding motion of said elongated slide member, at least one apron leaf hinged to said second elongated slide member along one edge thereof and disposed to travel with said elongated slide member so as to be propelled beyond said arms when said elongated slide members have traveled away from said free edge and at least one slide plate attached to said second elongated slide member and disposed to cover the area between said second elongated slide member and said free edge of the ramp when said elongated members are traveled away from said free edge, and means to effect sliding motion of said elongated members.

3. In a loading ramp wherein a movable platform is hinged along one edge to a stationary dock, the combination comprising a plurality of spaced parallel slide arms attached to and extending beyond the free edge of said movable platform opposite said hinged edge, each said arms being formed with a longitudinal slot shaped perforation, said slot shaped perforations being in substantial alignment with one another, an extensible and retractable apron having an elongated slide member positioned as projected through said slot shaped perforations of said slide arms and disposed to slide in said slot shaped perforations from one end of said slot shaped perforations to the other end, a hinge slide member positioned as projected over the upper surface of said slide arms and substantially parallel to said elongated slide member, said hinge slide member and said elongated slide member being rigidly attached to one another between said slide arms so that said hinge slide member will slide along the upper surface of said arms when said elongated slide member slides in said slot shaped perforations, a plurality of apron leaves hinged to said hinge slide member along one edge thereof and disposed to project beyond the free end of said arms when said hinge slide member is propelled away from said free edge and to substantially cover said arms when said hinge slide member is propelled to its position nearest said free edge, at least one plate member attached to said hinge member and disposed to cover the area between said hinge slide member and said free edge when said hinge slide member is propelled away from said free edge and to cover at least a portion of said movable platform when said hinge slide member is propelled towards said free edge and means to effect sliding travel of said elongated slide member in said slot shaped perforations.

4. In a loading ramp wherein a substantially rectangular platform is hinged along one edge to a loading dock so that the opposing free edge of said platform may be pivotally raised or lowered to engage varying height vehicle floors, the improvement in combination therewith comprising, a plurality of arms rigidly attached to and extending beyond the free edge of said platform, said arms each being formed with a longitudinally positioned slot, said slots being in substantial alignment with one another, a plurality of supporting members attached to said platform and extending beneath said arms so as to add supporting strength to said arms, an extensible and retractable apron consisting of an elongated member disposed to slide on the upper edges of said arms, a plurality of moving lugs rigidly attached to said elongated member, each said lugs being formed with a perforation, said perforations being in substantial alignment with one another and said longitudinally positioned slots of said arms, a second elongated member positioned as projected through said slots and the perforations of said lugs and disposed to slide in said slots so as to propel said elongated member along the upper edges of said arms, a plurality of apron leaves hinged along one edge to said elongated member and disposed to project in the direction of the free ends of said arms, a flat rectangular shaped member attached along one edge to said elongated member and disposed to cover the area between said elongated member and said free edge of the ramp and means to propel said second elongated member from one end of said slots to the other end.

References Cited in the file of this patent

UNITED STATES PATENTS

| | | |
|---|---|---|
| 2,639,450 | Ramer | May 26, 1953 |
| 2,689,965 | Fenton | Sept. 28, 1954 |
| 2,881,457 | Rodgers | Apr. 14, 1959 |
| 2,881,458 | Rodgers | Apr. 14, 1959 |

UNITED STATES PATENT OFFICE

CERTIFICATE OF CORRECTION

Patent No. 2,993,219                  July 25, 1961

William A. Pennington

It is hereby certified that error appears in the above numbered patent requiring correction and that the said Letters Patent should read as corrected below.

In the grant, lines 2 and 3, for "assignor to Superior Railway Products Corporation, of Pittsburgh, Pennsylvania, a corporation of Pennsylvania," read -- assignor, by mesne assignments, to Margaret R. Pennington, of Pittsburgh, Pennsylvania, --; line 12, for "Superior Railway Products Corporation, its successors" read -- Margaret R. Pennington, her heirs --; in the heading to the printed specification, lines 3, 4 and 5, for "assignor to Superior Railway Products Corporation, Pittsburgh, Pa., a corporation of Pennsylvania" read -- assignor, by mesne assignments, to Margaret R. Pennington, Pittsburgh, Pa. --.

Signed and sealed this 13th day of March 1962.

(SEAL)
Attest
ERNEST W. SWIDER                        DAVID L. LADD
Attesting Officer                       Commissioner of Patents